July 1, 1930.  N. E. GOODRICH  1,769,568
MASSAGING MACHINE
Filed Nov. 14, 1928

INVENTOR
Norris E. Goodrich
BY Chappell & Earl
ATTORNEYS

Patented July 1, 1930

1,769,568

UNITED STATES PATENT OFFICE

NORRIS E. GOODRICH, OF BATTLE CREEK, MICHIGAN, ASSIGNOR TO SANITARIUM EQUIPMENT COMPANY, OF BATTLE CREEK, MICHIGAN

MASSAGING MACHINE

Application filed November 14, 1928. Serial No. 319,311.

The main object of this invention is to provide an improved massaging machine in which the stroke may be quickly and accurately adjusted and with little effort on the part of the manipulator, at the same time the parts being effectively retained in adjusted position.

Objects relating to details and economies of my invention will appear from the description to follow. The invention is defined and pointed out in the claims.

A structure which is a preferred embodiment of my invention is illustrated in the accompanying drawing, in which.

Figure 1:
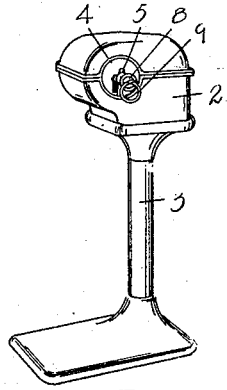
Fig. 1 is a perspective view of a massaging machine embodying the features of my invention.
Figure 3:
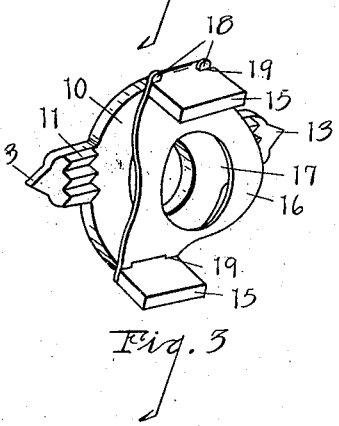
Fig. 3 is an inside perspective view of the crank pin clamp member.

Referring to the drawing, the motor and driving connections to the driven shaft 1 are housed within a casing or housing 2 which is mounted upon a suitable pedestal or stand 3. As the structural details of these parts form no part of my present invention, I have not shown the same herein, a satisfactory mechanism however being illustrated in my application for Letters Patent filed May 3, 1928, Serial No. 274,721.

The shaft 1 is provided with a pair of crank discs 4 as these are duplicates.

Each crank disc is provided with an undercut radial groove or way 5 adapted to receive the head 6 of the threaded crank pin stud 7. The body member 8 of the crank pin is threaded upon this stud and carries the applicator attaching hook 9, this attaching hook and its mounting being preferably that illustrated and described in detail in my application for Letters Patent filed August 6, 1928, Serial No. 297,730.

To facilitate the adjustment of the crank pin and effectively secure it in its adjusted positions, I provide a clamp 10 loosely mounted on the stud between the body member 8 and the disc and having inwardly facing teeth 11 adapted to coact with the serrations 12 on the disc, there being a row of serrations on each side of and parallel with the way 5.

The clamp is provided with pointers 13 operatively associated with the indicia 14 so that the length of the stroke may be readily determined. The clamp is provided with inwardly projecting lugs 15 slidably engaging with the way 5 to prevent rotative movement of the clamp.

The bowed spring 16 is arranged between the clamp and the disc, this spring having an opening 17 therein to receive the stud 7 and being provided with spaced fingers 18 at its ends engaging notches 19 provided therefor in the lugs 15. The spring is thus effectively retained and acts to disengage the clamp as when the body member or crank pin is turned outwardly on the stud. The clamp also serves as a lock washer for the body member.

By this arrangement, the crank pin may be quickly and easily adjusted to the desired position and is effectively retained in its adjusted position.

Figure 6:
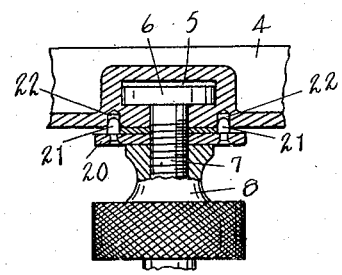
Fig. 6 is a fragmentary section of a slightly modified form or embodiment of my invention.
Figure 5:
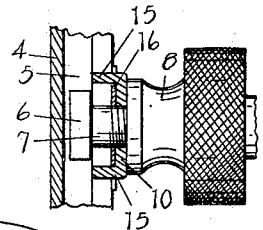
Fig. 5 is a fragmentary section on line 5—5 of Fig. 2.
Figure 2:
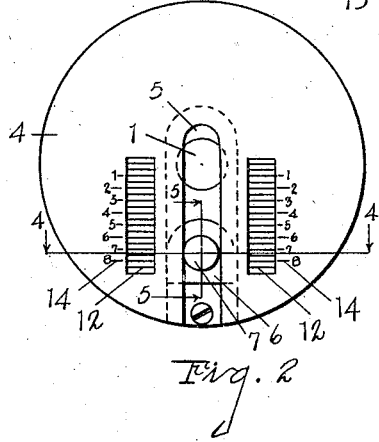
Fig. 2 is an enlarged face view of one of the crank discs, portions of the crank pin other than the stud being removed.
Figure 4:
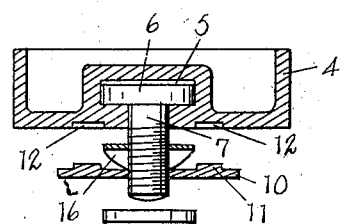
Fig. 4 is a detail view with certain parts in disassembled relation partially in section on a line corresponding to line 4—4 of Fig. 2.

In the modification shown in Fig. 6, the clamp member 20 is provided with pin-like teeth 21 adapted to engage with holes 22 on the disc.

I have illustrated only such portions of a massaging machine as seem to be desirable for an understanding of my improvements and while I contemplate other embodiments or adaptations than those illustrated, it is believed that this disclosure will enable those skilled in the art to embody my improvements as may be desired.

Having thus described my invention, what I claim as new and desire to secure by Letters Patent, is:

1. In a massaging machine, the combination of a crank disc provided with a radially disposed under cut way and having serrations disposed at the sides of and parallel with said way, a crank pin comprising a threaded stud provided with a head slidable in said way, a body member threaded upon said stud, a clamp loosely mounted on said stud on the inner side of said body member and provided with inturned lugs engaging said way and with teeth coacting with said serrations on said disc, a bowed spring arranged on the inner side of said clamp member and having spaced fingers at its ends engaging said lugs on said clamp member, said lugs being slotted to receive said fingers, and an applicator attaching member carried by said body member.

2. In a massaging machine, the combination of a crank disc provided with a radially disposed undercut way and having serrations disposed at the sides of and parallel with said way, a crank pin comprising a threaded stud provided with a head slidable in said way, a body member threaded upon said stud, a clamp loosely mounted on said stud on the inner side of said body member and provided with inturned lugs engaging said way and with teeth coacting with said serrations on said disc, a spring arranged on the inner side of said clamp member, and an applicator attaching member carried by said body member.

3. In a massaging machine, the combination of a crank disc provided with a radially disposed undercut way and having serrations disposed at the sides of and parallel with said way, a crank pin comprising a threaded stud provided with a head slidable in said way, a body member threaded upon said stud, a clamp loosely mounted on said stud on the inner side of said body member and provided with inturned lugs engaging said way and with teeth coacting with said serrations on said disc, and an applicator attaching member carried by said body member.

4. In a massaging machine, the combination of a crank disc provided with a radially disposed undercut way and having serrations disposed at the sides of and parallel with said way, said serrations having indicia associated therewith, a crank pin comprising a threaded stud provided with a head slidable in said way, a body member threaded upon said stud, a clamp loosely mounted on said stud on the inner side of said body member and provided with inturned lugs engaging said way and with teeth coacting with said serrations on said disc, said clamp member being provided with a pointer operatively associated with said indicia, and an applicator attaching member carried by said body member.

5. In a massaging machine, the combination of a crank disc provided with a radially disposed undercut way, a crank pin comprising a threaded stud provided with a head slidable in said way, a body member threaded on said stud, an applicator attaching member carried by said body member, a clamp loosely mounted on said stud on the inner side of said body member and provided with inturned lugs engaging said way, and a bowed spring arranged between said clamp and disc in retaining engagement with said lugs on said clamp.

6. In a massaging machine, the combination of a crank disc provided with a radially disposed undercut way, a crank pin comprising a threaded stud provided with a head slidable in said way, a body member threaded on said stud, an applicator attaching member carried by said body member, a clamp loosely mounted on said stud on the inner side of said body member and in sliding engagement with said way, said clamp being provided with disc engaging teeth, the disc being conformed to receive said teeth, said clamp member being also provided with a pointer and said disc with indicia operatively associated with said pointer, and a spring arranged on the inner side of said clamp member for disengaging its said teeth.

7. In a massaging machine, the combination of a crank disc provided with a radially disposed undercut way, a crank pin comprising a threaded stud provided with a head slidable in said way, a body member threaded on said stud, an applicator attaching member carried by said body member, a clamp loosely mounted on said stud on the inner side of said body member and in sliding engagement with said way, and a spring arranged on the inner side of said clamp member and acting to urge it to disengaging position.

8. In a massaging machine, the combination of a crank disc provided with a radially disposed undercut way, a crank pin comprising a threaded stud provided with a head slidable in said way, a body member threaded on said stud, an applicator attaching member carried by said body member, and a clamp loosely mounted on said stud on the inner side of said body member and in sliding engagement with said way.

In witness whereof I have hereunto set my hand.

NORRIS E. GOODRICH.